July 8, 1924.
B. H. HOWARD ET AL
FEEDER FOR INGOT MOLDS
Filed Dec. 29, 1923   2 Sheets-Sheet 1
1,500,736
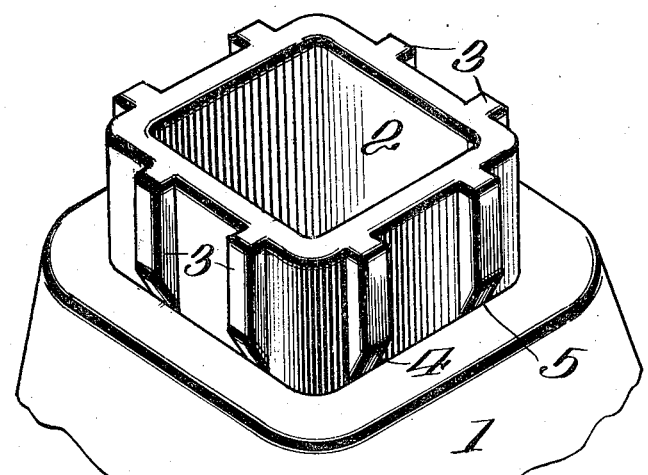
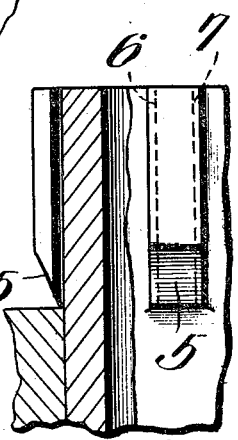
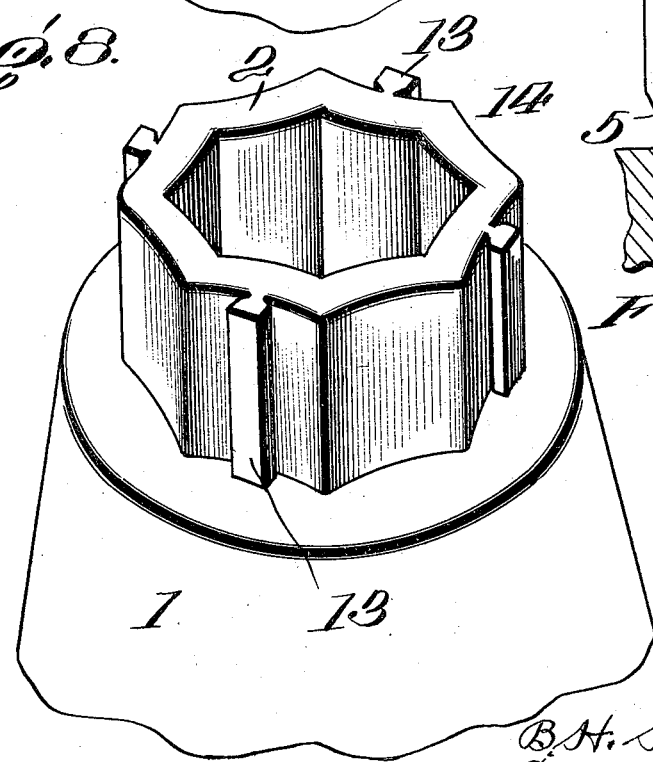
Inventors.
B. H. Howard.
E. J. Turner.
By C. R. Wright, Jr. Attorney

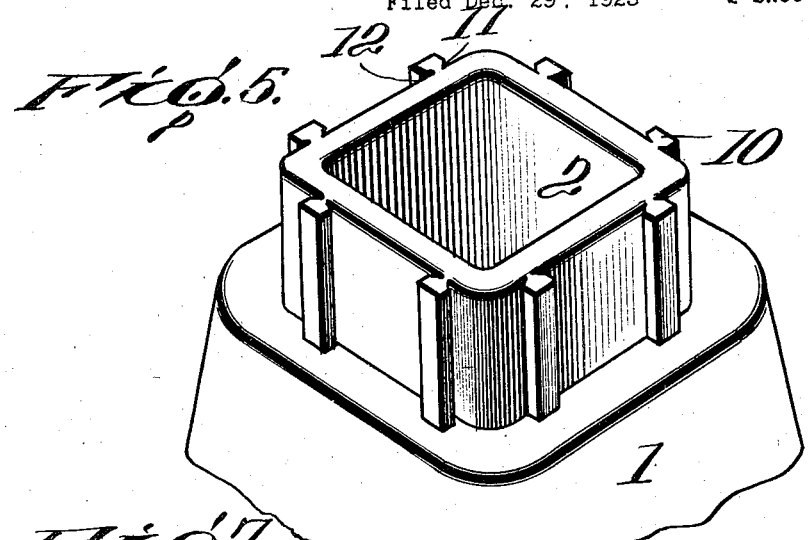
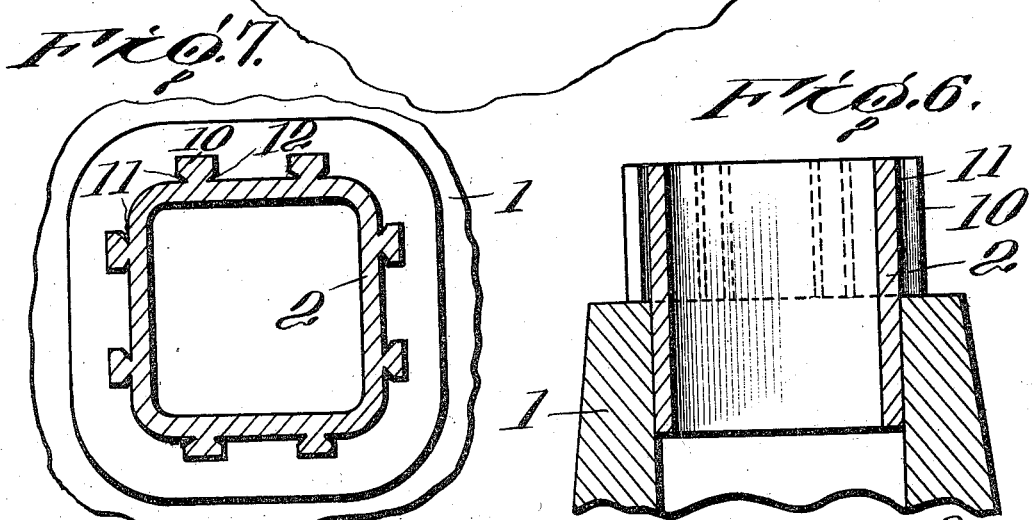
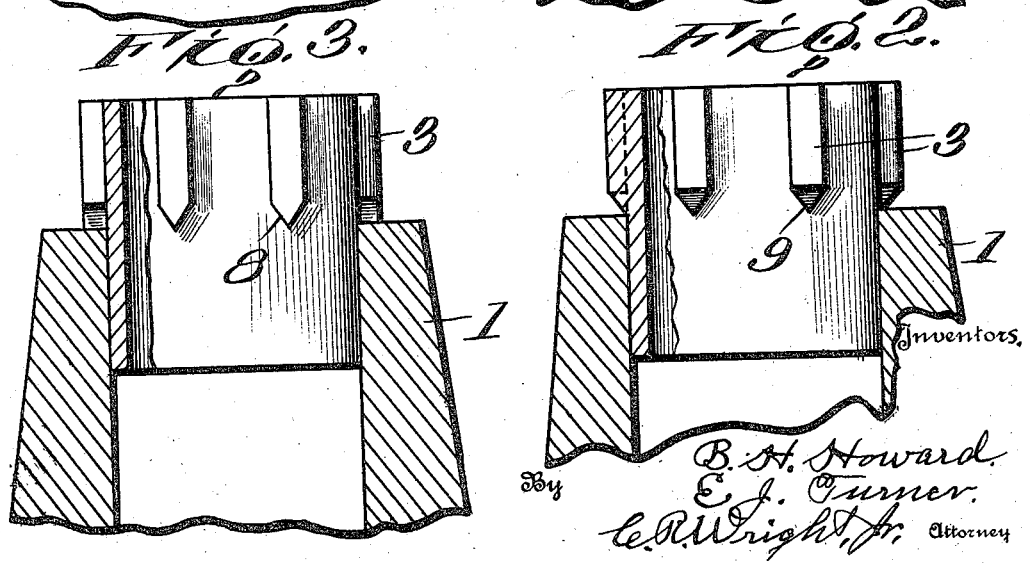

Patented July 8, 1924.

1,500,736

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed December 29, 1923. Serial No. 683,501.

*To all whom it may concern:*

Be it known that BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in feeders for ingot molds.

The object of our invention is to provide a feeder of this character in which the integral supporting means will lock the feeder in the mold in the event that the feeder is of an exterior diameter slightly less than that of the interior diameter of the mold.

Another object of our invention is to provide a feeder for ingot molds having integral means on its outer periphery for supporting the feeder in the upper end of the mold, and so arranged that they can be broken off if desired to allow the feeder to extend a greater distance into the mold and to be supported by any of the well known hangers and at the same time produce a feeder having all of the advantages of the ordinary feeder to prevent seams and holes known as " piping " and also reduce " segregation " to a minimum.

Another object of our invention is to provide a feeder requiring the minimum amount of material in its manufacture and at the same time produce maximum results.

A still further object of our invention is to provide a simple, cheap and effective feeder having certain details of structure and combination of parts hereinafter more fully set forth.

In the accompanying drawings.

Figure 1 is a perspective view of an ingot mold showing our improved feeder supported within the upper end thereof.

Figure 2 is a vertical sectional view of a mold showing a modified form of feeder applied thereto.

Figure 3 is a view similar to Figure 2 showing another modified form of feeder.

Figure 4 is a sectional view partly broken away, showing the ribs shown in Figure 1 scored so they can be broken off.

Figure 5 is a perspective view showing a modified form of ribs carried by the feeder.

Figure 6 is a vertical sectional view of Figure 5.

Figure 7 is a horizontal sectional view of Figure 5.

Figure 8 is a perspective view of a fluted feeder showing the form of ribs shown in Figure 5.

Referring now to the drawings 1 represents the ingot mold and 2 the feeder, and the outer faces of the feeder adjacent its upper end are provided on each side with vertically disposed ribs 3 and 4. While we have shown two ribs on each of the four sides of the feeder it will be understood that any desired number may be employed or they may be placed at the corner or at any desired point of the outer periphery of the feeder. The lower ends of the ribs are beveled inwardly as indicated at 5 so as to extend into the bore of the mold, in the event the exterior diameter of the feeder is slightly less than that of the bore of the mold. This locks the feeder in the top of the mold to prevent any movement of the same during the operation. These ribs adjacent the body portion of the feeder may be provided with the scored or weakened portions 6 and 7 as shown in Figure 4 whereby the ribs may be broken off and the feeder allowed to enter a greater distance into the mold. In this event any of the well known forms of hangers can be used to support the feeder in the upper end of the mold.

In the modified form shown in Figure 3 the ribs 3 have their lower ends wedge shaped as indicated at 8 whereby a knife edge supporting means is provided for engagement with the upper edge of the mold.

In the modification shown in Figure 2 the ribs 3 are tapered on three sides as indicated at 9 so that in the event the mold is of a slightly greater diameter than that of the exterior diameter of the feeder the lower pointed edge of the rib will enter the mold and firmly wedge the feeder in the upper end of the mold same as shown in Figure 1.

In Figures 5, 6 and 7 we have shown the ribs 10 scored on the opposite sides 11 and 12 so that they may be broken and the feeder supported in the mold as described in the description of Figure 4.

Figure 8 shows a fluted feeder having scored ribs carried by the body portion. It is understood that we do not wish to limit ourselves to the application of any of these forms of support to any specific shaped feeder, as the feeders may be made square, round, oblong, fluted, corrugated or of any other desired form.

While we have shown but four ribs 13 and eight flutes 14 shown in Figure 8 it will be understood that the number may be increased or decreased without departing from our invention.

Having thus fully described our invention what we claim is:—

1. A feeder for ingot molds comprising a body portion having longitudinal ribs formed integral therewith and having wedge shaped lower ends.

2. A feeder for ingot molds comprising a body portion having longitudinal integral ribs adjacent its upper end and beveled inwardly from their outer faces to the body of the feeder whereby the lower end may enter the bore of the mold and wedge the feeder therein.

3. A feeder for ingot molds comprising a body portion longitudinal ribs formed integral therewith and having their outer faces beveled to form pointed lower ends adapted to enter the bore of the ingot mold and adapted to wedge the feeder therein.

4. A feeder for ingot molds, comprising a body portion having longitudinal integral ribs adjacent its upper end and having wedge shaped lower edges adapted to enter the bore of the mold and said ribs weakened so that they may be broken off.

5. A feeder for ingot molds comprising a body portion having longitudinal integral ribs adjacent its upper end and wedge shaped lower ends adapted to enter the mold, said ribs scored on the opposite sides.

6. A feeder for ingot molds comprising a body portion longitudinal ribs formed integral with the body portion adjacent its upper end and having longitudinal scores on each side adjacent the connection with the body of the feeder whereby they may be broken off.

In testimony whereof we affix our signatures.

BLOOMFIELD H. HOWARD.
ERNEST J. TURNER.